Figure 1:
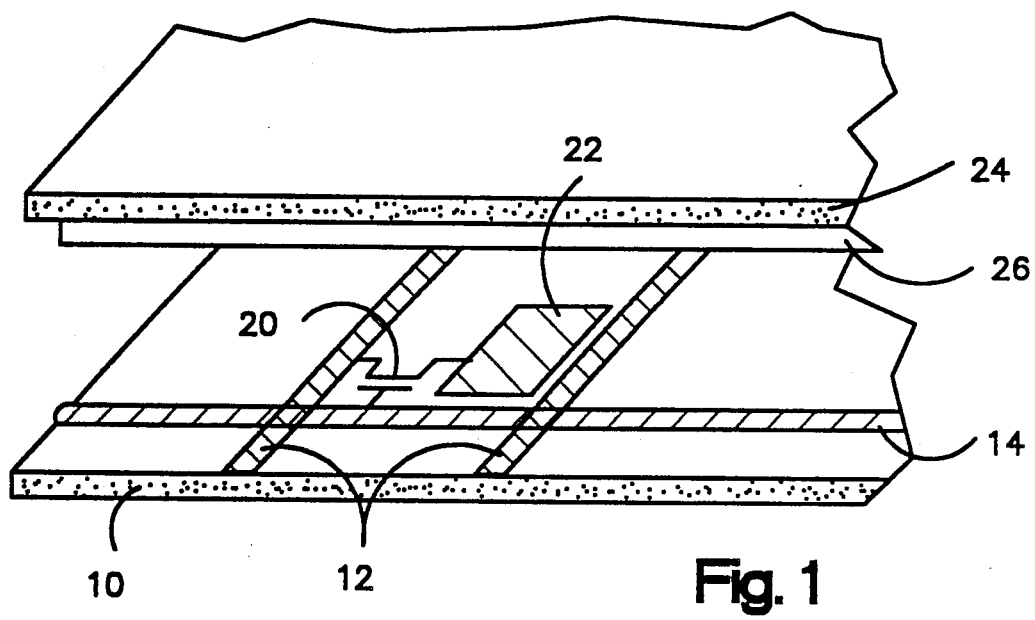

United States Patent [19]

Richard et al.

[11] Patent Number: 5,003,302

[45] Date of Patent: Mar. 26, 1991

[54] DUAL ADDRESSING TRANSISTOR ACTIVE MATRIX DISPLAY SCREEN

[75] Inventors: Joseph Richard, Ploubezre; Bruno Vinouze, Port-Blanc; Madeleine Bonnel, St. Iuay Perros, all of France

[73] Assignee: Centre National d'Etudes des Telecommunications, Issy-Les-Moulineaux, France

[21] Appl. No.: 882,906

[22] PCT Filed: Oct. 11, 1985

[86] PCT No.: PCT/FR85/00289

§ 371 Date: Jun. 16, 1986

§ 102(e) Date: Jun. 16, 1986

[87] PCT Pub. No.: WO86/02464

PCT Pub. Date: Apr. 24, 1986

[30] Foreign Application Priority Data

Oct. 17, 1984 [FR] France ................ 84 15899

[51] Int. Cl.⁵ .............................. G09G 3/36
[52] U.S. Cl. ................... 340/719; 340/718; 340/784
[58] Field of Search ............ 340/765, 784, 718, 719; 350/334, 331 R

[56] References Cited

U.S. PATENT DOCUMENTS 4,112,333 9/1978 Asars et al. ............ 340/719
4,431,217 2/1984 Okubo ................... 340/784
4,641,135 2/1987 Hilbrink ................. 340/784

FOREIGN PATENT DOCUMENTS 0031143 7/1981 European Pat. Off. .
2533072 7/1986 France .
2115199 9/1983 United Kingdom .

OTHER PUBLICATIONS

Application of Amorphous Silicon Field Effect Transistors in Addressable Liquid Crystal Display Panels, A. J. Snell, K. D. Mackenzie, W. E. Spcar, and P. G. LeComber, Applied Physics, 1981.
Proceedings of the IEEE, vol. 68, No. 10, Oct. 1980.

Primary Examiner—Jeffery A. Brier
Attorney, Agent, or Firm—Pearne, Gordon, McCoy & Granger

[57] ABSTRACT

Active matrix display screen comprising a matrix of display points and, between these points, addressing lines (Ln) and addressing columns (Cp), each point (Pn,p) being connected by a thin-film transistor (Tn,p) to a line (Ln) and a column (Cp). The screen is characterized by the fact that each point is further connected by a second transistor (Tn+1,p+1) to the next line (Ln+1) and to the next colunn (Cp+1). The effects of column breaks are thus eliminated.

2 Claims, 2 Drawing Sheets

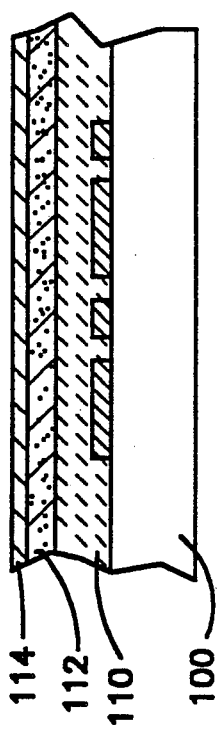
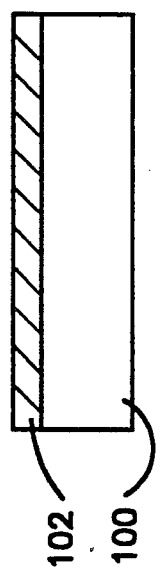
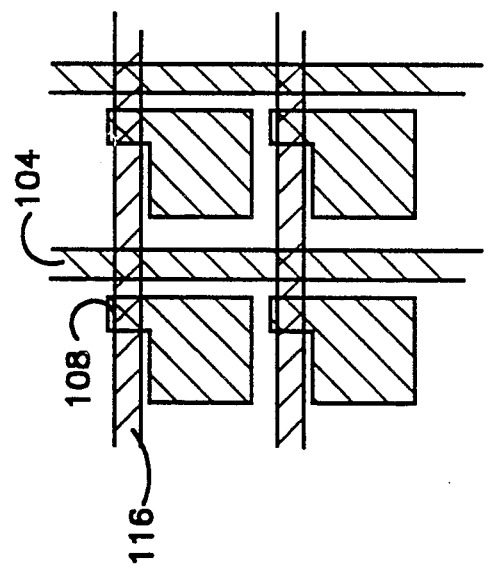
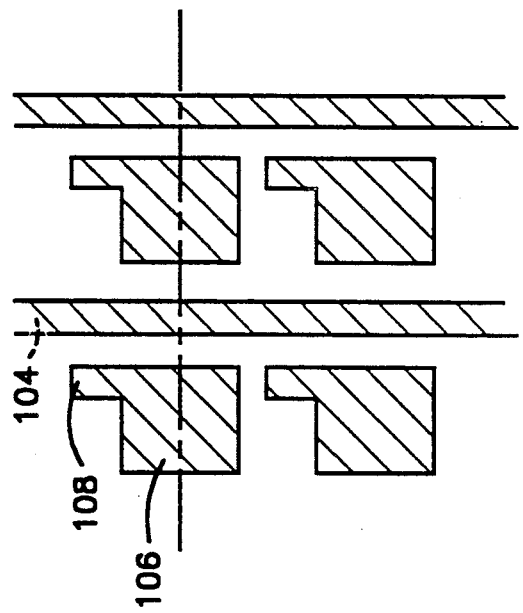
Fig. 3c
Fig. 3d
Fig. 3a
Fig. 3b

DUAL ADDRESSING TRANSISTOR ACTIVE MATRIX DISPLAY SCREEN

The present invention concerns a dual addressing transistor active matrix display screen.

An active matrix display screen is a device formed by a mosaic of memory points distributed over all of the surface of a support. These memory points store the video signal throughout the time for which an image is displayed. An electronic transducer (for example a liquid crystal) is in contact with each memory point. This transducer is energised throughout the duration of an image whereas, in systems with no electronic memory, the transducer is activated only for the time the point is energised. The optical effect and the multiplexing rate are thus improved.

The thin-film transistor (abbreviation TFT) is well suited to the implementation of a device of this kind. Each memory point is then situated at the crossing of an addressing column and a line and consists of an addressing TFT and a capacitor. When the transducer is a liquid crystal the plates of the capacitors consist of the electrodes of the liquid crystal cell themselves. The memory point is thus reduced to a TFT and a capacitor of which one plate is formed by the electrode deposited on one wall of the cell containing the liquid crystal, the other plate consisting of the counter-electrode disposed on the other wall of the cell.

A structure like this is shown in FIG. 1. There is seen, on the one hand, a lower wall 10 carrying conductive columns 12 and conductive lines 14, a TFT 20 and a transparent electrode 22 and, on the other hand, an upper wall 24 covered by a counter-electrode 26 that is also transparent.

A device of this kind is addressed in the following manner. The lines are energised sequentially at a potential that corresponds to the grid voltage needed to turn on the TFT. For as long as this potential is applied to a line the video signals are applied successively to the various columns, the effect of which is to excite all the display points (or "pixels") in the line. Once energisation of one line has been completed that of the next is begun, and so on.

The image is thus displayed point by point, each point retaining a memory of the excitation received by virtue of the capacitor structure of each pixel. The only loss of charge results from the leakage current flowing through the addressing transistor when this is cut off. However, the equivalent resistance of this transistor is generally very high (10⁻ohms) so that this effect is virtually of no consequence.

Figure 2:
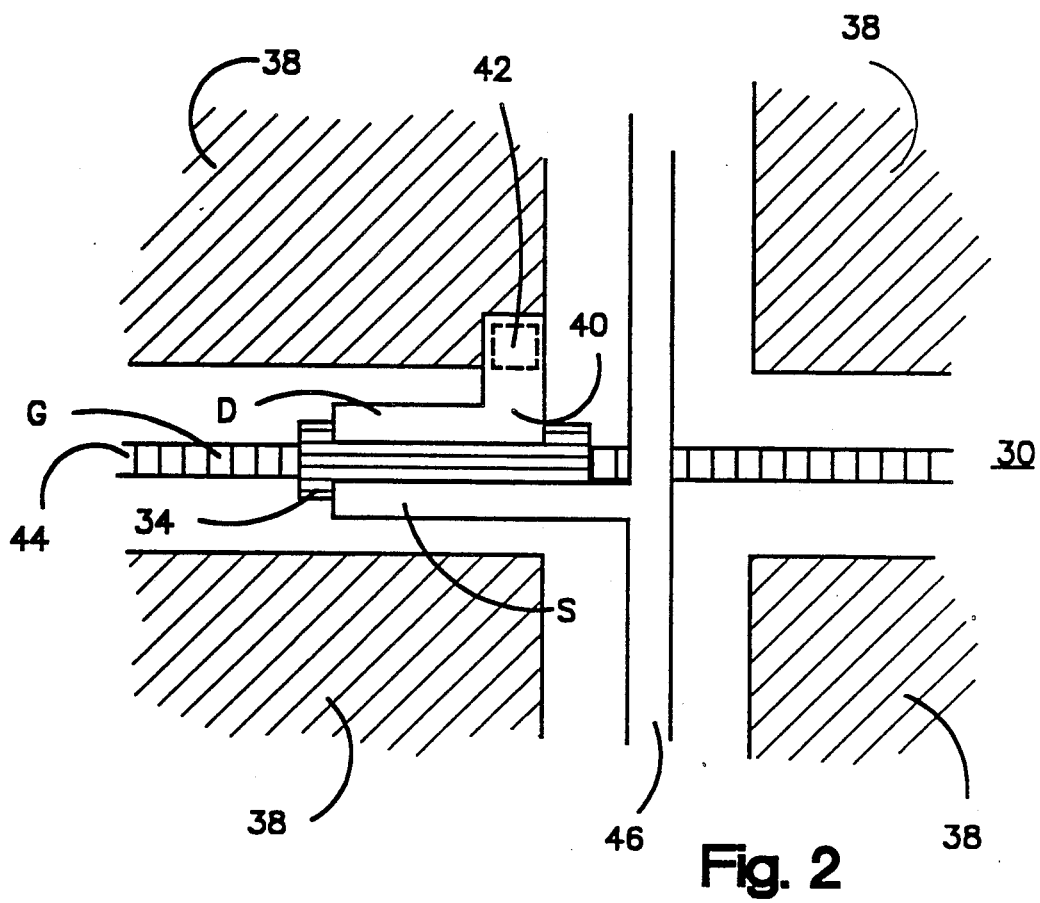

There are many known processes for fabricating active matrices using TFT and capacitors. FIG. 2 illustrates, by way of example, a technique described by A. J. Snell et al in an article entitled "Application of Amorphous Silicon Field Effect Transistors In Addressable Liquid Crystal Display Panels" published in "Applied Physics", 24, 357–362 (1981). The TFT is formed by a grid G of chromium deposited on an insulative substrate 30, a layer 34 of amorphous silicon (aSi), a drain D and an aluminium source S. The lower plate of the capacitor is formed by a layer 38 of tin and indium oxide. The connection between the TFT and the plate is made by the drain D extended by a tab 40 using a contact hole 42. The entire circuit is made up of a plurality of such structures laid out in matrix form. The grids G consist of connection lines 44 and the sources of columns 46.

In another known fabrication technique, differing from the previous one, the TFT has its source and drain contacts in the lower part and its grid in the upper part. This technique is described by N. Matsumura et al in an article entitled "Amorphous-Silicon Integrated Circuit" published in "Proceedings of the IEEE", vol. 68, No 10, Oct, 1980, pages 1349–1350.

Another known manufacturing process is more efficient than the previous two in the sense that it neccessitates only two levels of masking rather than five or six, as is the case in the two processes mentioned above. This technique is described in the published French patent No. FR-A-2533072 entitled "Procédéde fabrication de circuits électroniques à base de transistors en couches minces et de condensateurs"("Process for fabricating electronic circuits based on thin-film transistors and capacitors").

The various operations of this process are represented in FIGS. 3a, 3b, 3c and 3d which show various intermediate states of the screen obtained. These operations are as follows:

preparing a glass substrate 100, as sold under the trade name Corning 7059, for example, by physico-chemical cleaning;

depositing a layer 102 of transparent conductive material, for example tin and indium oxide (FIG. 3a);

photo-etching to form the layer 102 into columns 104 and pads 106 with a rectangular appendix 108 (FIG. 3b);

depositing a layer 110 of hydrogenated amorphous silicon, a layer 112 of silica and a layer 114 of aluminium, each deposition operation taking place at a temperature of approximately 250° C. (or higher if the CVD-plasma technique is used) (FIG. 3c);

photo-etching to define lines 116 overlapping the appendices 108 and defining the TFT (FIG. 3d);

general passivation by depositing a layer of $SiO_2$.

Using a technique of this kind the TFTs are localised in the overlapping areas of the lines 116 and the columns 104. The source and the drain respectively consist of the appendix 108 and the part of the column 104 situated under the line 116; the control grid consists of the part of the line 116 situated between the appendix 108 and the column 104.

It must be borne in mind that in all these processes for fabricating active matrices there exists for each display point a single addressing transistor providing the connection between an addressing column and the electrode defining the pixel.

Although such devices are adequate in certain respects, they nevertheless have a disadvantage associated with the fact that certain columns may be broken by microscratches. As a result, all or part of a column of pixels cannot be addressed. This results in the appearance of a black line on a white background or a white line on a black background, depending on the type of display, particularly unpleasant to the eye.

An object of the present invention is to alleviate this disadvantage. To this end the invention calls for the use of not one but two addressing transistors per pixel, the two transistors being connected to adjacent lines and columns.

In more precise terms, an electrode $P_{n,p}$ traditionally coupled to a line $L_n$ and a column $C_p$ by an addressing transistor $T_{n,p}$ is also connected to the next line $L_{n+1}$ and to the next column $C_{p+1}$ by a second transistor denoted $T_{n+1,p+1}$ (in this notation n and p are integers between 1 and N and P, respectively, where N and P are the numbers of lines and columns in the display).

The benefit of this arrangement is that if one of the addressing columns is broken the pixel can nevertheless be excited by the other column. For any pixel to be inaccessible it would thus be necessary for the two columns bracketing it to be simultaneously broken, the statistical probability of which is very low.

This arrangement does not in any way complicate the process for fabricating the display screen. It is sufficient to provide in any of the known processes, some of which have been briefly described above, for inclusion of a second TFT for each capacitor.

The presence of the second TFT naturally modifies slightly the process of addressing each pixel in the sense that the excited point Pn,p—rather than memorising the excitation corresponding to the line Ln and to the column Cp as in the prior art—will memorise the last excitation received (in this instance the second, if there is no break) which corresponds to line Ln+1 and column Cp+1. In most cases this modification is of no importance since it merely amounts to shifting the displayed image by one line interval and one column interval.

Figure 4:
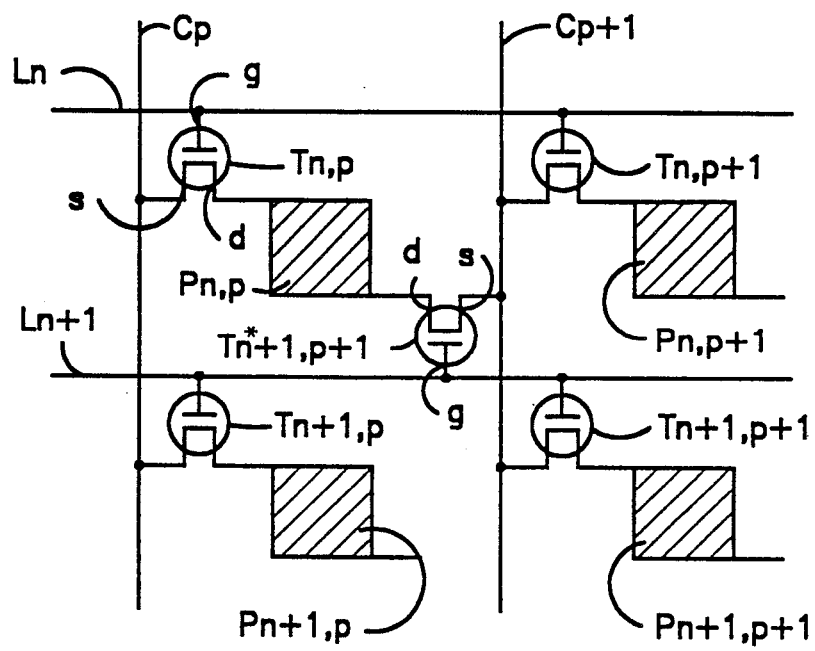
Figure 5:
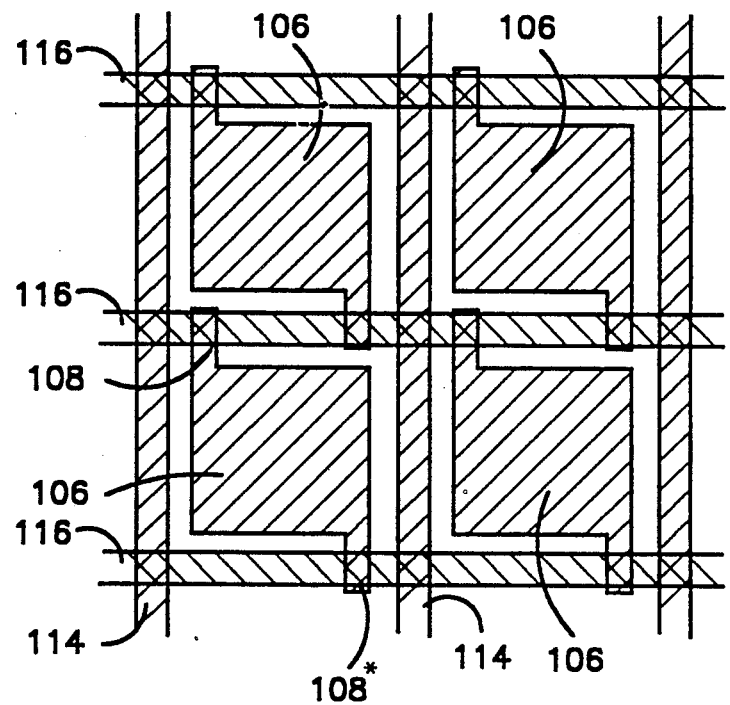

The characteristics of the invention will emerge better from the following description of embodiments of the invention given by way of non-limiting explanatory example only. This description refers to the appended drawings, in which:

FIG. 1, already described, is a schematic representation of an active matrix display point, FIG. 2, already described, illustrates a known process of fabricating an active matrix, FIGS. 3a, 3b, 3c and 3d, already described, illustrate another known process of fabricating an active matrix, FIG. 4 is a schematic representation of the operating principle of a display screen in accordance with the invention, FIG. 5 shows one typical implementation of a screen of this kind.

FIG. 4 shows schematically the operating principle of the active matrix display screen in accordance with the invention. The figure shows only two addressing lines of rank n and n+1 and only two columns of rank p and p+1. These lines and columns are denoted Ln, Ln+1 and Cp, Cp+1. A display point is marked by a double index, the first relating to the line overlying it and the second to the column preceding it. Thus the display point or pixel denoted Pn,p is the point situated under the line Ln and to the right of the column Cp.

The same convention is used for the addressing transistor Tn,p which connects the display point to the line Ln and to the column CP.

In accordance with the invention each display point Pn,p is connected to two addressing transistors: a first transistor Tn,p which connects it to Ln and Cp and a second transistor Tn+1, p+1 which connects it to Ln+1 and Cp+1.

Addressing is performed in the following manner. When the line Ln is active, Pn,p is excited via Tn,p when the column Cp receives the appropriate video signal. However, Pn,p is excited a second time when the line Ln+1 is active and when the column Cp+1 receives the video signal. It is therefore the second excitation that is finally memorised. Thus in the final analysis there occurs a translation of the image by a vector equal to the diagonal of the square delimited by two adjacent lines and two adjacent columns, since the information displayed at Pn,p is actually the information that, in the prior art devices, is displayed at Pn+1, p+1.

If one of the two columns Cp or Cp+1 is broken, Pn,p will nevertheless be excited by that of the two columns which is intact.

In certain cases the columns of the screen may be interleaved, meaning alternately connected to the addressing circuit by connection situated either at the top or at the bottom of the screen. Two columns which are adjacent in one of the addressing half-systems are not in fact adjacent in the overall system. This applies, for example to columns Cn+1, Cn+3 or Cn and Cn+2. In this case the effects of breaks in two adjacent columns are eliminated.

Any of the processes described above may be used to fabricate the display screen in accordance with the invention, with the modification consisting in the provision of two transistors per pixel instead of one. In an advantageous embodiment it is preferable to use the last process described, which requires only two masking levels. In this case the matrix is of the form shown in FIG. 5. The reference numbers repeat those used in the published French patent FR-A-2533072 already mentioned. Each display point comprises a rectangular pad 106 with two appendixes 108 and 108* which extend along two adjacent columns 114 and lie under two adjacent lines 116. The first addressing transistor is in the area of overlap between a line 116 and a column 114 and the first appendix 108. The second transistor is in the area of overlap between the next line and the second appendix 108* and the next column.

We claim:

1. Active matrix display screen comprising a matrix of display points and, between these display points, addressing lines (Ln) and addressing columns (Cp), wherein a display point (Pn,p) is located between a first addressing line (Ln) and the next addressing line (Ln+1) which addresses a first adjacent display point (Pn+1, p) and between a first addressing column (Cp) and the next addressing column (Cp+1) which addresses a second adjacent display point (Pn,p+1), said point (Pn,p) being connected by a thin film transistor (Tn,p) to said line (Ln) and said column (Cp), wherein said point (Pn,p) is further connected by a second transistor (T*n+1, p+1) to said next line (Ln+1) and to said next column (Cp+1).

2. Display screen according to claim 1, wherein each display point (Pn,p) consists of a rectangular pad of conductive material joined to an appendix (108) which is inserted under the addressing line (116) corresponding to this point and extending in the vicinity of the addressing column (104) corresponding to this point, the addressing transistor (Tn,p) of each point being situated in the area of overlap between the corresponding addressing line (Ln) and, respectively, this appendix (108) and the corresponding column (114), this screen being characterised in that the rectangular pad comprises a second appendix (108*) inserted under the next addressing line and extending in the vicinity of the next addressing column, a second addressing transistor being thus formed for the same addressing point, in the area of overlap between the next line and, respectively, the second appendix (108*) and the next column.

* * * * *